United States Patent
Steinglass et al.

(10) Patent No.: US 7,389,417 B1
(45) Date of Patent: Jun. 17, 2008

(54) MODULAR USER INTERFACE

(75) Inventors: Alice Steinglass, Seattle, WA (US);
Yasser Asmi, Redmond, WA (US);
Roxana Arama, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 833 days.

(21) Appl. No.: 10/766,082

(22) Filed: Jan. 28, 2004

(51) Int. Cl.
*G06F 17/24* (2006.01)
*G06F 9/24* (2006.01)
*G06F 9/312* (2006.01)

(52) U.S. Cl. .................. 713/167; 715/744; 715/825

(58) Field of Classification Search .............. 715/826, 715/835, 825, 967, 969, 866; 713/167
See application file for complete search history.

(56) References Cited

U.S. PATENT DOCUMENTS 6,832,178 B1 * 12/2004 Fernandez et al. .......... 702/189
2004/0225794 A1 * 11/2004 Thornton ................... 710/301

OTHER PUBLICATIONS

Alien Skin Software. "eye Candy 4000" Features 1,2,3 available http://www.alienskin.com/ec4k/ec4000_features html; http://www.alienskin.com/ec4k/ec4000_features2html.; and http://www.alienskin.com/ec4k/ec4000_features3html. Printed Dec. 23, 2003. 6pp. total.

Corel ™ KPT@ collection Brochure. 1995. 2pp.
Da Silva, Paulo Pinheiro, "Object Modelling of Interactive Systems: The UML/approach." Thesis. University of Manchester. 2002, pp. 1-12, 17-39, 141-147, and 187-190.
Doyle, Audrey. A Plethora of Plug-Ins adds power to After Effects. "*Computer Graphics World*" graphics.3d modeling, case and visual computing. Available http://cgw.pennnet.com/Articles/Article_Display.cfm?Section=Archives&Subsection=Display &ARTICLE... Printed Dec. 23, 2003, 6pp.

(Continued)

*Primary Examiner*—Gilberto Barron, Jr.
*Assistant Examiner*—Venkat Perungavoor
(74) *Attorney, Agent, or Firm*—Workman Nydegger

(57) ABSTRACT

A modular user interface (UI) with consistent sensory interactions across a plurality of selectable UI features that involve user interactions with a computing device. A controlling program invokes one or more functional UI modules each of which performs a data function of the corresponding UI feature. The data functions do not involve any sensory interaction with the user. Instead, a UI plug-in implements sensory interactions with the user, such as displays, sounds, animation, data entry, etc. The sensory interactions are based on the data functions and a skin file of visual, audio, layout, and other sensory data. The skin file, the UI plug-in, and the functional UI modules can be independently modified or replaced at any time to change sensory and/or functional aspects of the UI features. A UI engine manages computing resources and acts as a common communication gateway between the controlling program, functional UI modules, and UI plug-in.

12 Claims, 7 Drawing Sheets

OTHER PUBLICATIONS

Sloss, Joel. "KPT converter." *Windows Network & Net Magazine*. Available http://www.winnetmag.com/Article/ArticleID/2457/2457.html. Printed Dec. 23, 2003. Mar. 1996. 2pp.

Microsoft Corporation. "Microsoft Windows CE 3.0. Introduction to User Interface Services on Windows CE." MSDN. © 2003 Microsoft Corporation. Available http://msdn.microsoft.com/library/default.asp?url=library/en-us/wceui/htm/__wcesdk__gwes_component_mod..., http://msdn.microsoft.com/library/en-us/wceui/htm/__wcesdk__GWES__Component__Model.asp?frame=true, http://msdn.microsoft.com/library/en-us/wceui/htm/__wcesdk__window__Management__and__Event__Handling.a..., http://msdn.microsoft.com/library/en-us/wceui/htm/__wcesdk__Event__Handling.asp?frame=true, and http://msdn.microsoft.com/library/en-us/wceui/htm/__wcesdk__User__Input__Support.asp?frame=true Printed Jan. 2, 2004. 6 pp. total.

* cited by examiner

MODULAR USER INTERFACE

FIELD OF THE INVENTION

The present invention generally relates to providing selectable user interface (UI) features having consistent sensory interactions with users, and more specifically, pertains to a UI system comprising independently interchangeable modules that provide functional features of the UI that are separate from visual, audio, or other sensory aspects that are applied consistently across all of the UI features.

BACKGROUND OF THE INVENTION

Game software, application programs, and other software systems typically include a UI that employs visual, audio, and other sensory interactions with a user to exchange information with the user, i.e., by enabling both input and output of information. For example, drop-down menus, graphical buttons, dialog boxes, synthesized speech, and other UI software objects in graphical UIs generally enable a user to select and execute functions and receive messages. These UI objects can be customized, and all sensory aspects of the UI can often be modified by selecting a skin to customize the appearance, audio, and other aspects of the UI. Skins may be applied to the UI in application programs, such as Microsoft Corporation's MEDIA PLAYER™, to change the overall appearance of the UI. However, skins do not change the underlying functions of the UI, but instead, simply change the look of the graphic components. For instance, the visual appearance of data selection lists, data entry fields, and other UI objects that are required for various functions of an application program can be customized with different graphical borders, backgrounds, text, and other visual characteristics. However, the functions performed by the application program remain the same, even though the skin is changed. If new functions are added to the application program, any corresponding skins must be modified to recognize the new function. Alternatively, the developer of the new function can create a separate UI for that function. Clearly, a separate UI for a new function is likely to be very noticeable, and possibly confusing, to users.

On a larger scale, an application program often has a different UI than an underlying operating system. For example, a personal computer (PC) operating system typically employs a desktop graphical UI with a graphical workspace and a number of selectable icons that enable a user to invoke application programs or perform other functions associated with the operating system. The workspace and icons usually have visual characteristics such as colors, borders, shadowing, and other characteristics that are not consistently carried into application programs. Instead, each application program typically provides its own workspace, toolbar buttons, menus, and other features with visual characteristics that are optimized for the tasks of the application program. These visual differences are also noticeable in regard to the functions within application programs and the functions provided by the operating system.

However, in many circumstances, it is desirable to enable a user to access operating system functions from an application program, or to enable a user to access functions of one application program from another application program. For third-party developers, it is also desirable to add functions to an application program without having to create a separate UI or fully integrate the new function into the UI code of the application program. In such cases, it would be desirable to provide a consistent UI to reduce a user's need to understand different UI characteristics, to reduce user confusion, and to otherwise provide a consistently familiar experience. For example, users of limited-capability devices, such as game consoles and hand-held devices, would benefit from a consistent UI to access new and old functions of various programs and the underlying operating system. In particular, a game program typically has its own distinct visual and audio characteristics for facilitating UI functions, such as selecting game options and entering game-related data. However, games also frequently employ UI functions that are part of the game console's underlying operating system, such as those associated with network communications to enable a user to participate in game play over the Internet or other network. To make the network communication function appear to be integrated with the game, it is desirable to apply the game's visual, audio, and other sensory characteristics to the operating system's network communication functions.

Conversely, as is evident by the popularity of skins, users and/or developers often prefer to apply a custom UI that provides unique visual, audio, animation, or other sensory aspects to functions provided by programs or functions provided by the operating system. Thus, it is desirable, to enable users and/or developers to change the sensory aspects of programs and the operating system without having to change the associated functional aspects. Accordingly, there is a need for a modular approach to UIs that separates functional features from sensory aspects so that changes to one can be implemented without the need to change the other. In addition, such a modular approach should provide consistent sensory aspects to application program functions, operating system functions, third-party functions, added functions, or other functional features that involve user interaction.

SUMMARY OF THE INVENTION

The present invention is directed to a method and system for providing a modular UI with consistent sensory interactions across a plurality of selectable UI features. UI features include enabling a user to enter data; displaying data to the user; providing audible sounds to the user; enabling the user to logon and communicate over a network with a remote computing device, and manage a custom list of users on remote computing devices; and enabling the user to control configuration settings, and facilitate other user interactions with a computing device. An application program, a game, an operating system, or other controlling program invokes one or more functional UI modules that each perform a data function of the corresponding feature. The data functions do not involve any sensory interaction with the user. Instead, the UI module causes a UI plug-in module to perform any sensory interactions with the user, such as displaying data, producing audio sounds, performing animation sequences, providing data entry fields, or providing other UI objects that involve sensory interaction with the user. The sensory interactions are based on the data functions of the functional UI modules and are based on a skin file with a predefined set of sensory data that provides consistent sensory interaction with the user. However, the sensory interaction remains independent from the UI modules. Accordingly, the skin file can be modified or replaced prior to, or during runtime execution of the controlling program to change the visual, audio, and other sensory aspects of the UI features without affecting the functional aspects of the UI features. In addition to changing the skin file, the UI plug-in can also be independently modified or replaced to change animations and other sensory aspects of all UI features in a consistent manner without having to modify or replace the functional UI modules. Similarly, the functional UI modules can be independently modified or replaced, and new functional UI modules can be added or deleted, without having to modify or replace the UI plug-in or the skin file. The result is an entirely modular UI.

Preferably, the controlling program instructs a UI engine to invoke the selected functional UI module. The UI engine relays the instructions to the appropriate module and controls communication between the functional UI modules and UI plug-in. Although functional UI modules and the UI plug-in can be implemented to communicate directly with each other, the UI engine preferably acts as a common communication gateway for interchangeable modules and plug-ins that are not necessarily compatible. The UI engine also preferably manages computing resources allocated by the controlling program for use by the functional UI modules and the UI plug-in. The computing resources are preferably allocated at each execution frame, enabling the controlling program to prioritize operations of the controlling program over those of the UI. Other resource management techniques are also possible.

Another aspect of the present invention is directed to a memory medium that stores machine instructions for carrying out the steps described above and in accord with the present invention, as discussed in further detail below.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

A preferred embodiment of the present invention is described below in regard to an exemplary use in providing a consistent UI for functions of an electronic gaming system that is designed to execute gaming software in coordination with a network gaming service. Those skilled in the art will recognize that the present invention may be implemented for consistent visual, audio, tactile, and other sensory aspects of software UI objects. It is also emphasized that the present invention can be practiced on a variety of computing machines such as a personal computer (PC), a set-top box, an arcade game, a hand-held device, and other related systems that involve sensory interactions with a user.

Exemplary Operating Environment

Figure 1:
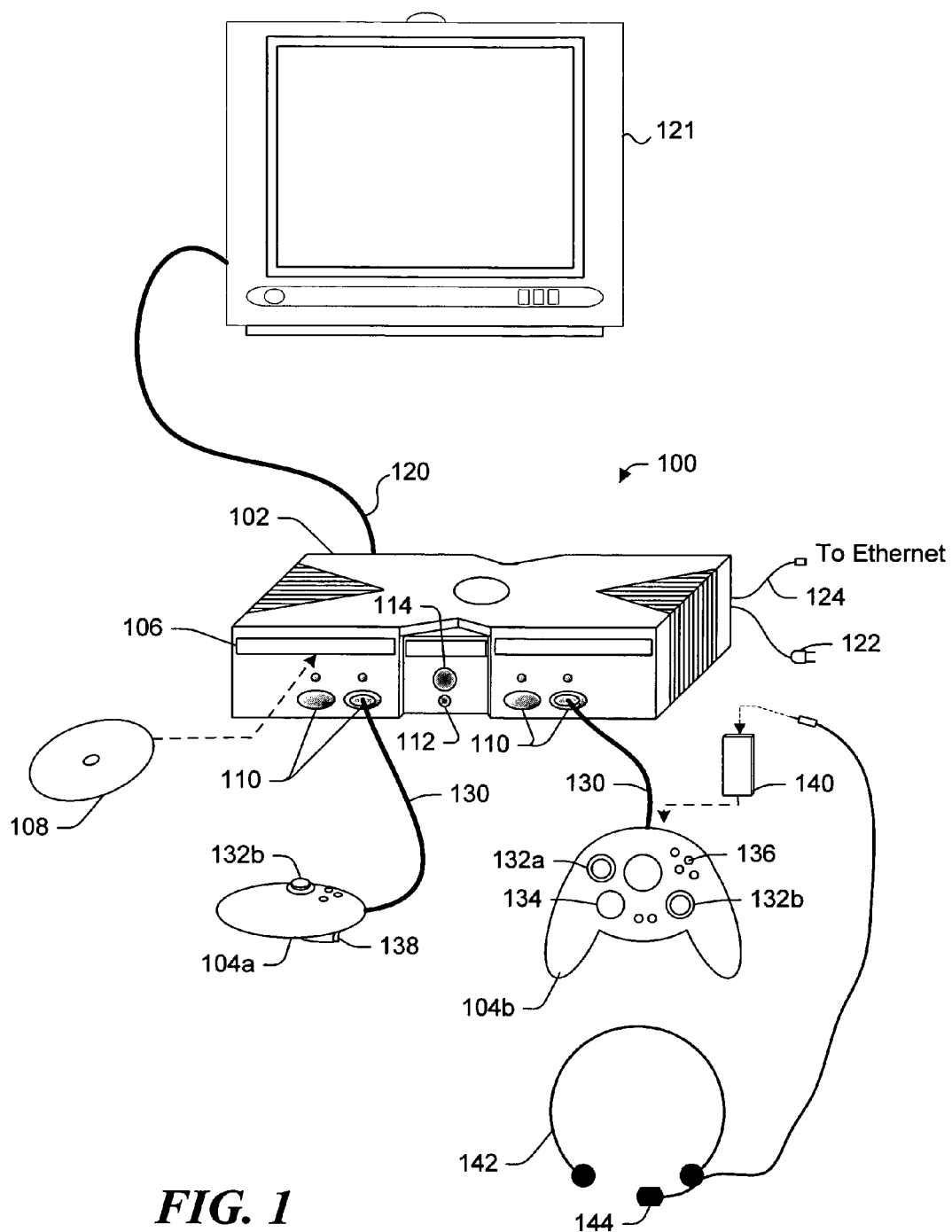
FIG. 1 illustrates an exemplary electronic gaming system that includes a game console and support for up to four user input devices.

As shown in FIG. 1, an exemplary electronic gaming system 100 that is suitable for practicing the present invention includes a game console 102 and support for up to four user input devices, such as controllers 104a and 104b. Game console 102 is equipped with an internal hard disk drive (not shown in this Figure) and an optical media drive 106 that reads various forms of portable optical storage media, as represented by an optical storage disc 108. Examples of suitable portable storage media include digital versatile discs (DVDs) and compact disc-read only memory discs (CD-ROMs). In this gaming system, game programs are preferably distributed for use with the game console on DVD discs, but it is also contemplated that other storage media might instead be used on this or other types of systems that employ the present invention.

On a front face of game console 102 are four slots 110 for connection to supported controllers, although the number and arrangement of the slots may be modified as needed to support more or fewer controllers. A power button 112 and an eject button 114 are also positioned on the front face of game console 102. Power button 112 controls application of electrical power to the game console, and eject button 114 alternately opens and closes a tray (not shown) of optical media drive 106 to enable insertion and extraction of storage disk 108, so that the digital data stored on it can be read for use by the game console.

Game console 102 connects to a television 121 or other display, monitor, or screen via audio/visual (A/V) interface cables 120. A power cable plug 122 conveys electrical power to the game console when connected to a conventional alternating current line source (not shown). Game console 102 includes an Ethernet data connector 124 to transfer and receive data over a network (such as through a connection to a hub or a switch) (not shown), or over the Internet, for example, through a connection to an xDSL interface, a cable modem, or other broadband interface (not shown). Other types of game consoles that implement the present invention may be coupled together or to a remote server, by communicating using a conventional telephone modem.

Each controller 104a and 104b is coupled to game console 102 via a lead (or alternatively through a wireless interface). In the illustrated implementation, the controllers are USB compatible and are connected to game console 102 via USB cables 130; however, it is contemplated that other types of data interfaces may instead be employed. Game console 102 may be equipped with any of a wide variety of user devices for interacting with and controlling the game software. As illustrated in FIG. 1, each controller 104a and 104b is equipped with two thumbsticks 132a and 132b, a D-pad 134, buttons 136, and two triggers 138. These controllers are merely representative, and other gaming input and control devices may be substituted for or added to those shown in FIG. 1 for use with game console 102.

A removable function unit 140 can optionally be inserted into each controller 104a and 104b to provide additional features and functions. For example, a portable memory unit (MU) enables users to store game parameters and port them for play on other game consoles, by inserting the portable MU into a controller connected to the other game console. Another removable functional unit comprises a voice communication unit that enables a user to verbally communicate with other users locally and/or over a network. Connected to the voice communication unit is a headset 142, which includes a boom microphone 144. The circuitry of the voice communication unit may alternatively be integrated into the controller, and a headset with boom microphone may be removably or permanently connected to the controller. Preferably, each controller is configured to accommodate two removable function units, although more or fewer than two removable function units or modules may instead be employed.

Gaming system 100 is capable of playing, for example, games, music, and videos. It is contemplated that other functions can be implemented using digital data stored on the hard disk drive or read from optical storage disc 108 in drive 106, or using digital data obtained from an online source, or from a MU. For example, gaming system 100 is capable of playing:

Game titles stored on CD and DVD discs read by the optical media drive, stored on the hard disk drive, or downloaded from an online source;

Digital music stored on a CD read by optical media drive 106, in a file on the hard disk drive (e.g., WINDOWS MEDIA AUDIO™ (WMA) format), or derived from online streaming sources on the Internet or other network; and Digital A/V data stored on a DVD disc read by optical media drive 106, or in files stored on the hard disk drive (e.g., in an Active Streaming Format), or accessed from online streaming sources over the Internet or other network.

Figure 2:
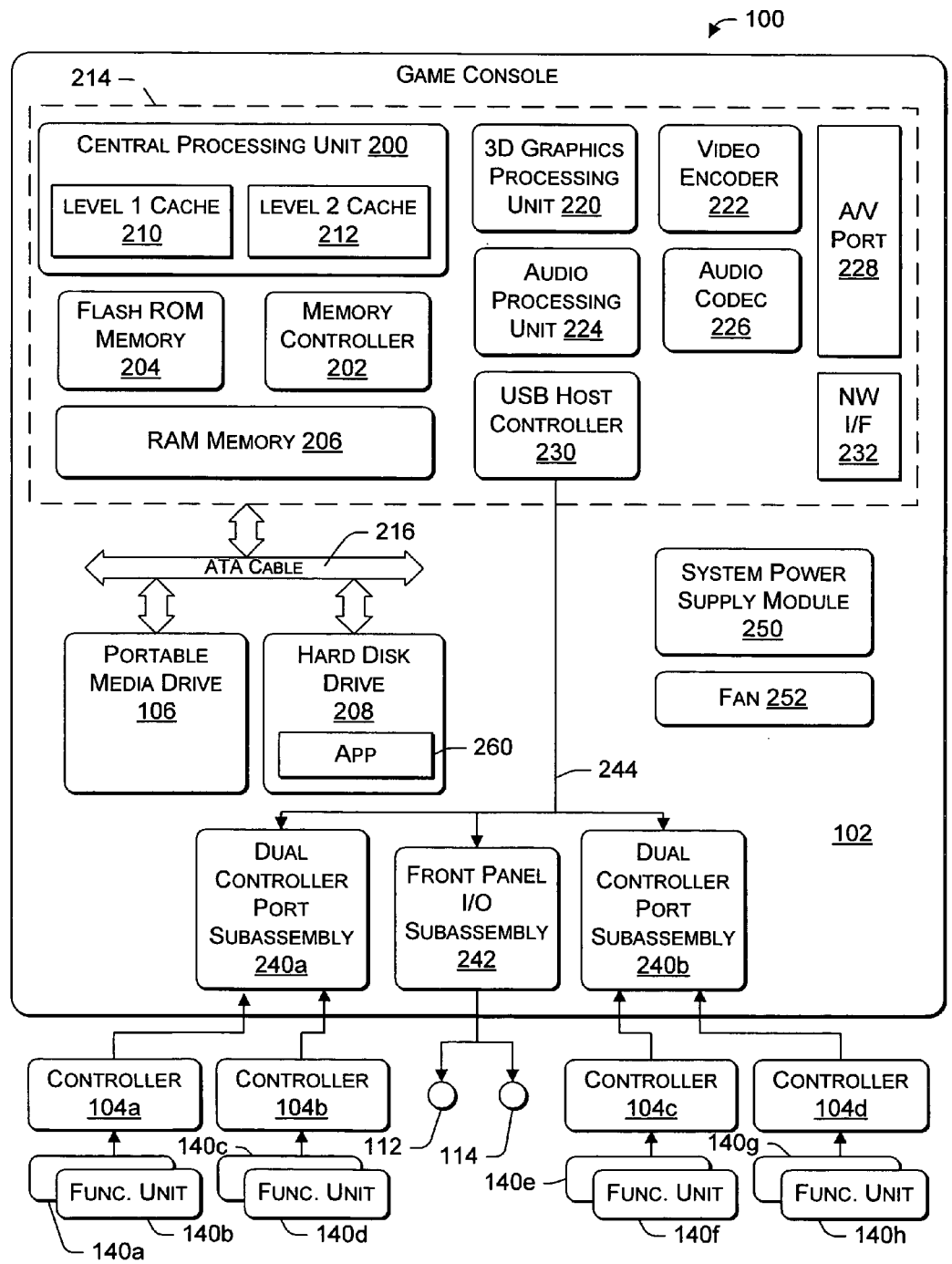
FIG. 2 is a functional block diagram showing components of the gaming system of FIG. 1 in greater detail.

FIG. 2 shows functional components of gaming system 100 in greater detail. Game console 102 includes a CPU 200, a memory controller 202 that facilitates CPU access to a read-only memory (ROM) 204, a random access memory (RAM) 206, a hard disk drive 208, and portable optical media drive 106. CPU 200 is equipped with a level 1 cache 210 and a level 2 cache 212 to temporarily store data so as to reduce the number of memory access cycles required, thereby improving processing speed and throughput of the gaming system. CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a micro channel architecture (MCA) bus, an enhanced ISA (EISA) bus, a Video Electronics Standards Association (VESA) local bus, and a peripheral component interconnect (PCI) bus.

As an example of one suitable implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple double data rate synchronous dynamic RAM modules (DDR SDRAM modules) that are independently controlled by memory controller 202 via separate buses (not shown). Hard disk drive 208 and optical media drive 106 are connected to the memory controller via the PCI bus and an advanced technology attachment (ATA) bus 216.

A 3D graphics processing unit (GPU) 220 and a video encoder 222 form a video processing pipeline for high-speed and high-resolution graphics processing. Data are conveyed from GPU 220 to video encoder 222 via a digital video bus (not shown). An audio processing unit 224 and an audio encoder/decoder (CODEC) 226 form a corresponding audio processing pipeline for high fidelity and stereo audio data processing. Audio data are conveyed between audio processing unit 224 and audio CODEC 226 via a communication link (not shown). The video and audio processing pipelines output data to an A/V port 228 for transmission to the television or other display monitor. In the illustrated implementation, video and audio processing components 220-228 are mounted on module 214.

Also implemented on module 214 are a USB host controller 230 and a network interface 232. USB host controller 230 is coupled to CPU 200 and memory controller 202 via a bus (e.g., the PCI bus), and serves as a host for peripheral game controllers 104a-104d. Network interface 232 provides access to a network (e.g., the Internet, home network, etc.) and may include any of a wide variety of various wire or wireless interface components, including an Ethernet card, a telephone modem interface, a Bluetooth module, a cable modem interface, an xDSL interface, and the like.

Game console 102 has two dual controller support subassemblies 240a and 240b, and each subassembly supports two of game controllers 104a-104d. A front panel input/output (I/O) subassembly 242 supports the functionality of power button 112 and eject button 114, as well as any light emitting diodes (LEDs) or other indicators exposed on the outer surface of the game console. Subassemblies 240a, 240b, and 242 are coupled to module 214 via one or more cable assemblies 244.

Eight function units 140a-140h are illustrated as being connectable to four controllers 104a-104d, i.e., two function units for each controller. Each function unit offers additional functionality or storage for games, game parameters, and other data. When an MU is inserted into a controller, the MU can be accessed by memory controller 202.

A system power supply module 250 provides power to the components of gaming system 100. A fan 252 cools the components and circuitry within game console 102.

To implement the present invention, a game software application 260 comprising machine instructions stored on a DVD or other storage media (or downloaded over the network) is loaded into RAM 206 and/or caches 210 and/or 212 for execution by CPU 200. Portions of software application 260 may be loaded into RAM only when needed, or all of the software application (depending on its size) may be loaded into RAM 206. Software application 260 and the relevant functions that it performs to implement the present invention are described below in greater detail.

Gaming system 100 may be operated as a stand-alone system by simply connecting the system to a television or other display monitor. In this stand-alone mode, gaming system 100 enables one or more users to play games, watch movies, or listen to music. However, with connectivity to the Internet or other network, which is made available through network interface 232, gaming system 100 may be further operated as a component of a larger network gaming community, to enable online multiplayer interaction in games that are played over the Internet or other network with players using other gaming systems. Gaming system 100 can also be coupled in peer-to-peer communication with another gaming system using the network interface and an appropriate cable (not shown).

Network System

Figure 3:
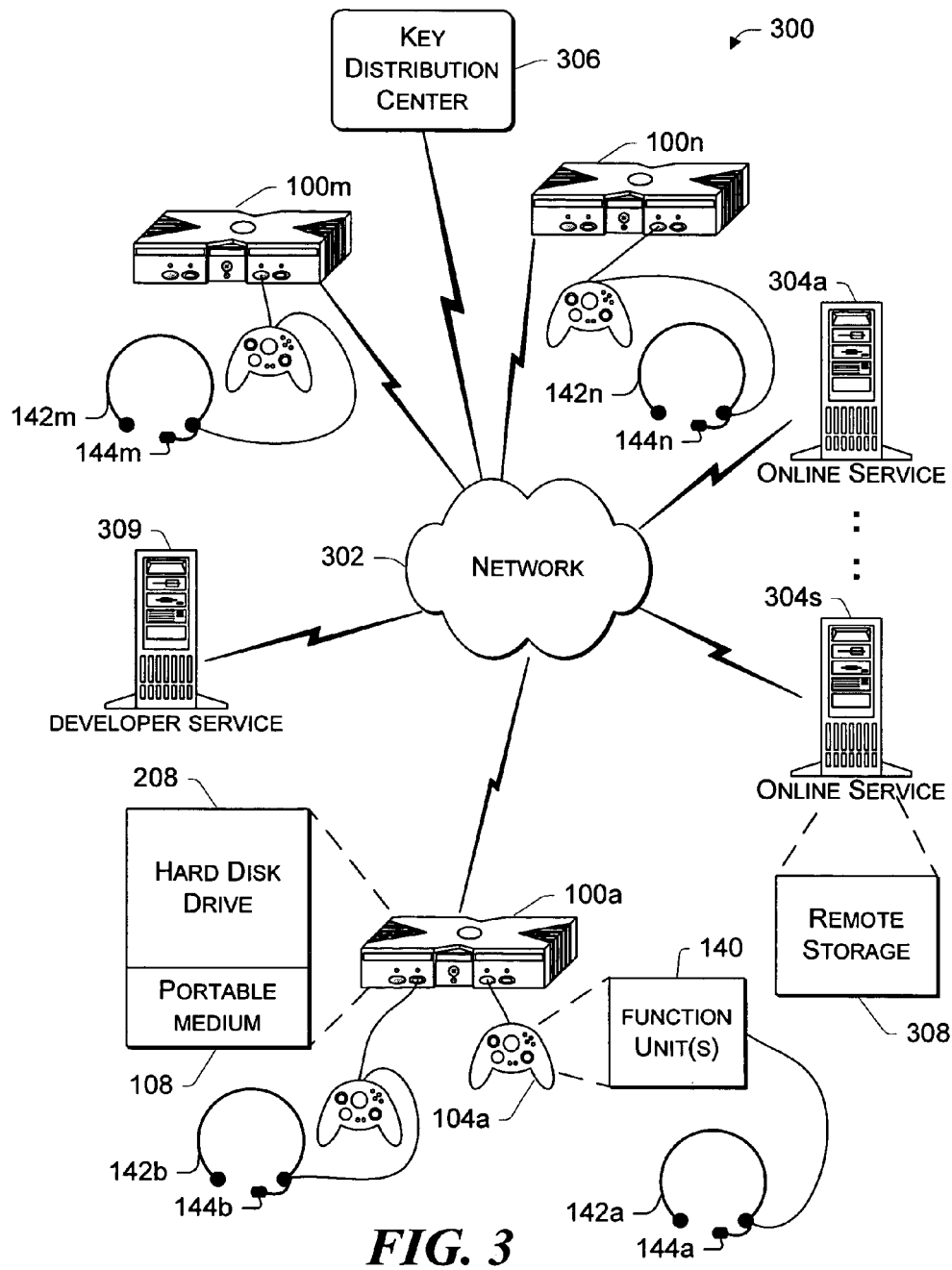
FIG. 3 is a schematic diagram showing an exemplary network gaming environment that interconnects multiple gaming systems like that shown in FIGS. 1 and 2 over a network.

FIG. 3 shows an exemplary network gaming environment 300 that interconnects multiple gaming systems 100a, . . . 100n via a network 302. Preferably, each gaming system includes at least one corresponding headset 142a, . . . 142n and corresponding microphone 144a, . . . 144n for voice communication between players. Network 302 represents any of a wide variety of data communication networks and may include public portions (e.g., the Internet), as well as private portions (e.g., a residential or commercial local area network (LAN)). Network 302 may be implemented using any one or more of a wide variety of conventional communication configurations, including both wired and wireless types. Any of a wide variety of communications protocols can be used to communicate data via network 302, including both public and proprietary protocols. Examples of such protocols include TCP/IP, IPX/SPX, NetBEUI, etc.

In addition to gaming systems 100a, . . . 100n, one or more online services 304a, . . . 304s are accessible via network 302 to provide various services for the participants, such as serving and/or hosting online games, serving downloadable music or video files, hosting gaming competitions, serving streaming A/V files, enabling exchange of email or other media communications, and the like. Network gaming environment 300 may further employ a key distribution center 306 that plays a role in authenticating individual players and/or gaming systems 100a, . . . 100n for interconnection to one another, as well as to online services 304a, . . . 304s. Distribution center 306 distributes keys and service tickets to valid subscribing participants that may then be used to form game playing groups of multiple players, or to purchase services from online services 304a, . . . 304s.

Network gaming environment 300 introduces another memory source available to individual gaming systems 100a, . . . 100n, i.e., online storage. In addition to accessing data on optical storage disk 108, hard disk drive 208, and function unit 140, gaming systems 100a, . . . 100n can also access data files available at remote storage locations via network 302, as exemplified by remote storage 308 at online service 304s.

Network gaming environment 300 further includes a developer service 309 with which developers can produce media effects, updated media data, game code, and other services. Such services can be distributed between the online services and the producers of games for the gaming systems, and between other devices within, and outside of network gaming environment 300. It should be noted that in a preferred form, the network gaming environment is a closed network, providing only access to other gaming systems and the gaming environment, using communication through virtual private network tunnels to provide enhanced security and preclude access by other computing devices.

Exemplary Software Architecture

Figure 4:
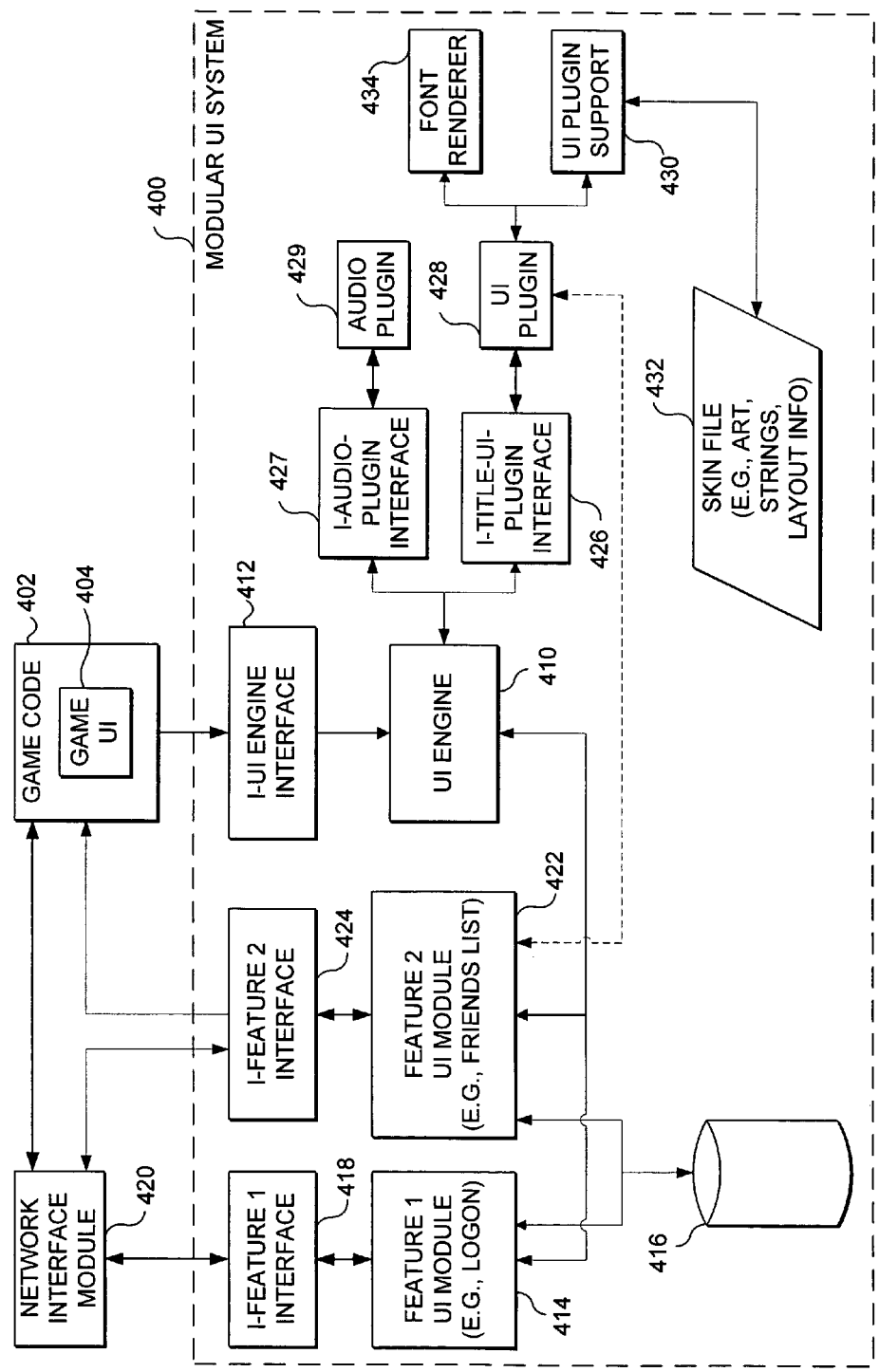
FIG. 4 is a functional block diagram illustrating an architecture of software modules for a modular UI system.

A preferred embodiment of the present invention is directed to a game or other simulation that includes a consistent visual and audio style for each display of its graphical UI. FIG. 4 is a functional block diagram illustrating an architecture of software modules for a modular UI system 400 that enables the consistent visual and audio style while also enabling interchangeability of UI features. Modular UI system 400 communicates with a game code module 402 or other main control program. Other main control programs can include an application program, a simulation, an operating system, or other primary program module. Game code module 402 includes a game UI 404 for initiating and controlling UI functions relevant to game code module 402. Preferably, game UI 404 simply identifies or provides data that is respectively required by or provided by, game code module 402. Game UI 404 enables a user to select and initiate a UI operation for obtaining or providing data used by game code module 402. However, game UI 404 does not perform any data manipulations or sensory functions (such as audio/visual functions) needed to fulfill a UI feature that involves interaction with a human user. Instead, as indicated above, game UI 404 preferably enables a user to select and initiate a UI feature, while interaction details are left to modular UI system 400.

Game code module 402 and corresponding game UI 404 communicate instructions and resource allocations to a UI engine 410 through an I-LIVE-ENGINE interface 412. Those skilled in the art will recognize that I-LIVE-ENGINE interface 412 can be a component of UI engine 410 rather than separate modules. In any case, UI engine 410 and I-LIVE-ENGINE interface 412 operate according to well defined communication protocols, and validates communication from game UI 404 to ensure conformance to the protocols. By providing an interface standard, any game or other control program can utilize modular UI system 400 rather than write a custom UI. Other interface modules described below provide similar standardization.

UI engine 410 also manages allocated resources and communications among other modules of modular UI system 400. For example, UI engine 410 receives an allocation of processor cycles from game code 402 and divides the processor cycles among other modules of modular UI system 400 as needed to accomplish as many UI steps as possible within the current allocation of processor cycles. Preferably, game code 402 provides an allocation of processor cycles and other resources to UI engine 410 during each execution frame. In this way, game code 402 can control the amount of UI processing performed without degrading real time performance of game functions. Those skilled in the art will recognize that a multi-threaded architecture or other resource management techniques can be employed to ensure smooth operation of the game and communicate information among modules of modular UI system 400.

UI engine 410 communicates with one or more UI modules that implement UI features with functions that do not directly involve sensory interaction with a user. For example, UI engine 410 communicates with a feature 1 logon UI module 414 that performs background functions enabling a user to logon to a remote gaming service. (Feature 1 logon UI module 414 is hereinafter referred to as logon UI module 414 to simplify discussion of this exemplary UI module.) Logon UI module 414 can check for previously stored logon data from a data store 416 or request that another portion of modular UI system 400 obtain the logon data from the user. Regardless of the source of the logon information, logon UI module 414 communicates through an I-FEATURE 1 interface 418 to a network interface module 420, thereby establishing communication with the remote gaming service and communicating logon data between the remote gaming service and modular UI system 400 without performing any functions involving visual or audio interaction with the user. More specifically, logon UI module 414 initiates communication with the remote gaming service and relays a user ID and password to the remote gaming service. However, logon UI module 414 does not perform sensory UI functions such as displaying data entry fields, providing audio indications, or performing other operations that involve sensory interaction with the user to obtain the user ID and password. Instead, logon UI module 414 performs only the non-visual, non-audio, and other non-sensory functions needed to achieve the objective of enabling logon to the remote gaming service. Note also that logon UI module 414 is an example of a UI module that does not require direct interaction with, or control by, game code 402. Instead, logon UI module 414 works under control of UI engine 410 to perform its functions and communicate with other modules of the game console.

An alternative example that does involve interaction with game code 402 is illustrated by a Feature 2 Friends List UI module 422. (Feature 2 Friends List UI module 422 is hereinafter referred to as Friends List UI module 422 to simplify discussion of this exemplary UI module.) Similar to the logon UI module, Friends List UI module 422 communicates through an I-FEATURE 2 interface 424 and network interface module 420 to the online gaming service to obtain and manage a list of and/or a current status of a user's friends. Friends List UI module 422 can then communicate through I-FEATURE 2 interface 424 with game code 402 to provide a list of and/or a current status of the user's friends that are associated with the current game.

Those skilled in the art will recognize that additional UI modules can be provided to modular UI system 400 to enable custom UI features. The UI modules can perform any variety of on-line and/or off-line functions. For example, a virtual keyboard UI module can perform data functions relevant to defining a graphical representation of a keyboard for display by the UI plug-in and processing input from a user through the virtual keyboard. The virtual keyboard UI module preferably operates off-line (e.g., does not require communication through network interface 420). However, the virtual keyboard UI module can communicate to other UI modules (optionally through UI engine 410), some of which could perform on-line functions. Preferably, during an initialization stage, game code 402 selectively indicates the UI features that are to be active during a game.

To maintain audio and visual consistency across any selected set of UI modules, sensory aspects of UI features are provided independent of the UI modules. The UI modules communicate functional data and instructions to one or more replaceable plug-in modules, each of which implements a particular sensory interaction with the human user (e.g., visual interaction, audio interaction, etc.). Preferably, UI modules communicate through UI engine 410, which provides a common communication scheme between UI modules and plug-in modules. However, those skilled in the art will recognize that plug-in modules and UI modules can communicate directly if they share a common communication scheme. When going through UI engine 410, an I-TITLE-UI-PLUG-IN interface 426 is used to exchange data and instructions with a UI plug-in 428. UI plug-in 428 provides visual interaction with the user through visual UI objects, such as data entry fields, data lists, text titles, and other visual UI objects associated with the data required by or specified by the UI modules. Similarly, UI engine 410 communicates through an I-AUDIO-PLUG-IN interface 427 to exchange data and instructions with an audio plug-in 429. Audio plug-in 429 provides audio interaction with the user through audio UI objects, such as warning sounds, speech, and other audio UI objects associated with the data required by or specified by the UI modules.

However, the plug-in modules can be programmed to provide any manner of sensory interaction. For example, an instruction from a UI module to display a data entry field can cause UI plug-in 428 to provide an animation sequence that incorporates the data entry field. Accordingly, any sensory interaction can be provided by replaceable plug-in modules. The modular architecture separates the sensory aspects of the plug-in modules from the functional features of the UI modules, enabling software developers to provide custom sensory interactions with users based on the same functional data and instructions provided by the UI modules.

Although plug-in modules can be substituted to provide different sensory interactions relative to functional data and instructions from UI modules, it is desirable that sensory aspects such as display layout, graphics, text fonts, and other sensory characteristics remain consistent regardless of which functional UI module is operating. For example, it is desirable for a data list box to be displayed with the same graphic borders regardless of whether the content of the data list box comprises logon user IDs from logon UI module 414 or comprises available friends from Friends List UI module 422. To provide this visual consistency, UI plug-in 428 communicates through a UI plug-in support module 430 to a skin file 432 that stores a common set of sensory data. Skin file 432 includes image data for borders, backgrounds, and other display objects, along with display layout information, text strings, and other predefined sensory data. UI plug-in 428 uses the predefined sensory data of skin file 432 to provide the desired consistent visual interaction with the user. UI plug-in 428 can also pass some of the predefined sensory data to other support modules, such as a font renderer 434, to offload some common tasks. Those skilled in the art will recognize that other plug-in modules can access the skin file or analogous file of predefined sensory data and can utilize other support modules.

Figure 5:
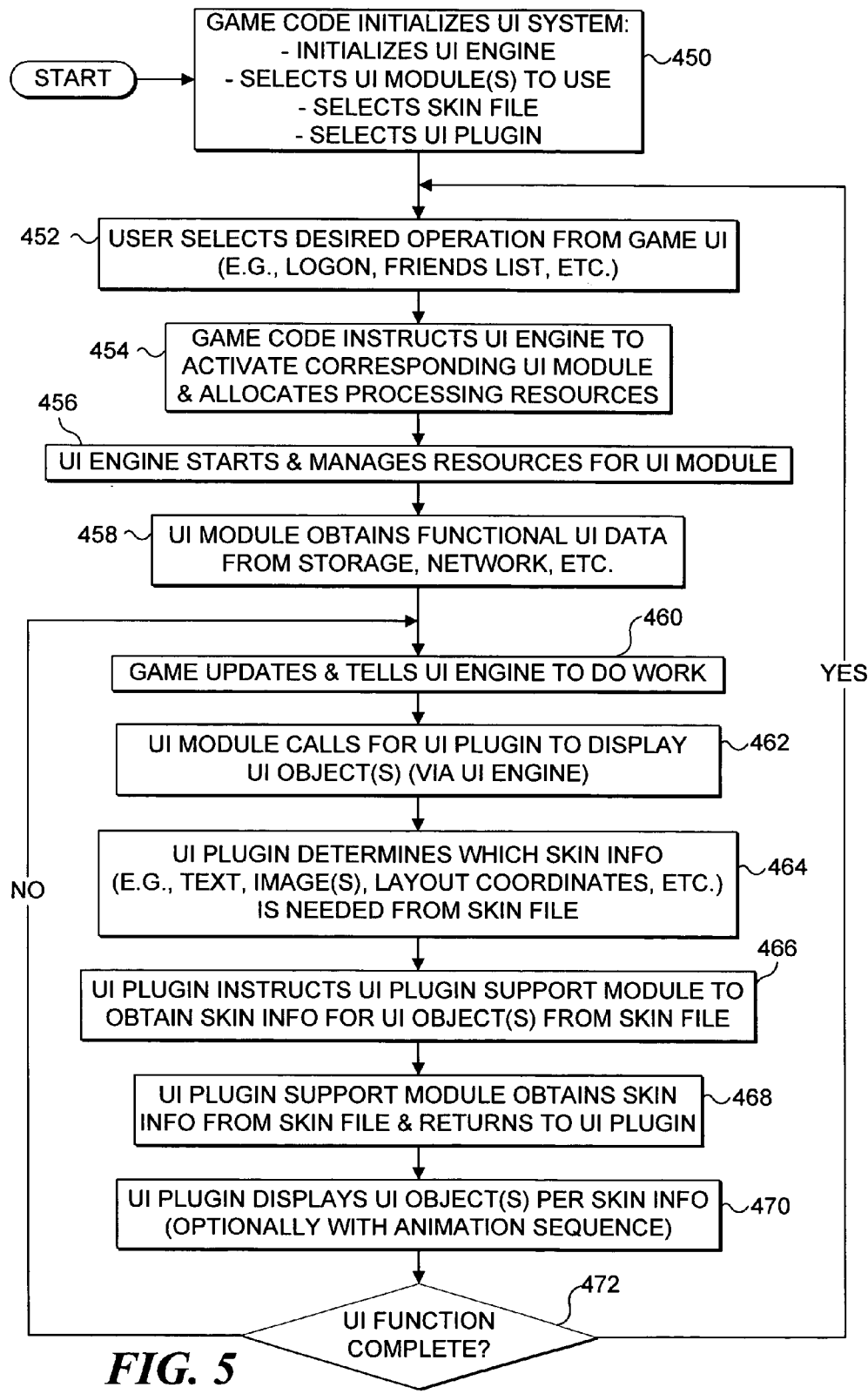
FIG. 5 is a flow diagram illustrating overall logic for implementing a UI feature via the modular UI system.

FIG. 5 is a flow diagram illustrating overall logic for implementing a UI feature via the modular UI system. At a step 450, the game code initializes the modular UI system. Preferably, this initialization occurs during game initialization, prior to a user beginning game play. However, those skilled in the art will recognize that some initialization processes can be performed during game runtime to initialize additional UI features or replace specific UI features. For example, the game code can instruct the modular UI system to select a different UI plug-in module and/or a different skin file when a user achieves a higher level of play. Initially, however, the game code initializes the modular UI system by initializing the UI engine and selecting functional UI modules, a skin file, and a UI plug-in module. A default set of modules and skin data can be initialized if the game code does not make specific other selections.

At a step 452, a user selects a desired operation via a standard game UI. For example, the user can use a game's menu system to initiate a desired operation such as initiating the process of logging on to a remote gaming service, viewing or updating a friend's list, modifying game play parameters, and carrying out other operations that involve user interaction. At a step 454, the game code instructs the UI engine to activate the corresponding UI module. Preferably, part of that instruction includes an allocation of processing resources such as processor cycles and memory. As indicated above, the game code allocates processing resources such that the modular UI system does not interfere with smooth execution of the game. The allocation is preferably updated for each display frame to prevent jitter or other display discontinuities. Resource management can also be controlled with a separate thread in multi-threaded systems. However, in single-threaded systems, such as game consoles, resource allocations are determined by the game code and managed by the UI engine. Accordingly, at a step 456, the UI engine starts operating and invokes the UI module needed to perform the selected UI function.

At a step 458, the invoked UI module obtains functional UI data from a data store, network, or other source, as predefined in the UI module. As indicated above, the UI module preferably performs non-sensory data functions. The UI module collects and processes data from storage, network resources, and user input without the need to understand the screen layout or other aspects involving a user's sensory interaction with the game console.

As indicated by a step 460, the game updates its state at each frame and authorizes the UI engine to use additional resources to perform further steps toward completing the user selected UI function. After the UI module obtains sufficient UI data and/or reaches an execution step that requires sensory interaction with the user, the UI module calls for the UI plug-in to display appropriate UI objects at a step 462. For example, the UI module can instruct the UI plug-in to display a data entry field. The UI module can also instruct the plug-in to provide an audio indication to the user. As indicated above, communication from the UI module is preferably relayed through the UI engine, which provides a common communication interface, regardless of the UI modules and/or UI plug-in that are being used. Based on the UI objects to be displayed, the UI plug-in determines the skin information that will be needed from the skin file, at a step 464. For instance, the UI plug-in can determine layout coordinates for locating the data entry fields, determine text to be displayed next to the input data field, and determine any border images to be displayed around the input data field.

At a step 466, the UI plug-in instructs the UI plug-in support module to obtain the needed skin information for the specified UI objects. At a step 468, the UI plug-in support module accesses the skin file and returns the needed skin information to the UI plug-in. At a step 470, the UI plug-in displays the UI objects based on the skin information. To display the UI objects, the UI plug-in can call the font renderer and/or other support modules. The audio plug-in or other plug-in modules can also be invoked at this point to provide other sensory interaction with the user. Any user input is read directly by the game code, which can relay the input through the UI engine to the appropriate UI module for further processing. At a decision step 472, the UI engine determines whether the UI module or game code has indicated that the UI function is complete. If the UI function is not complete, control returns to the processing step that is most appropriate for the selected UI function. Preferably, control returns to step 460 where the game updates its state and notifies the UI engine whether to perform additional work. For example, if the user entered some data that is to be processed by a UI module, control passes to the UI module. If, however, the UI function is complete, control returns to step 452 to await user selection of another UI function.

Figure 6:
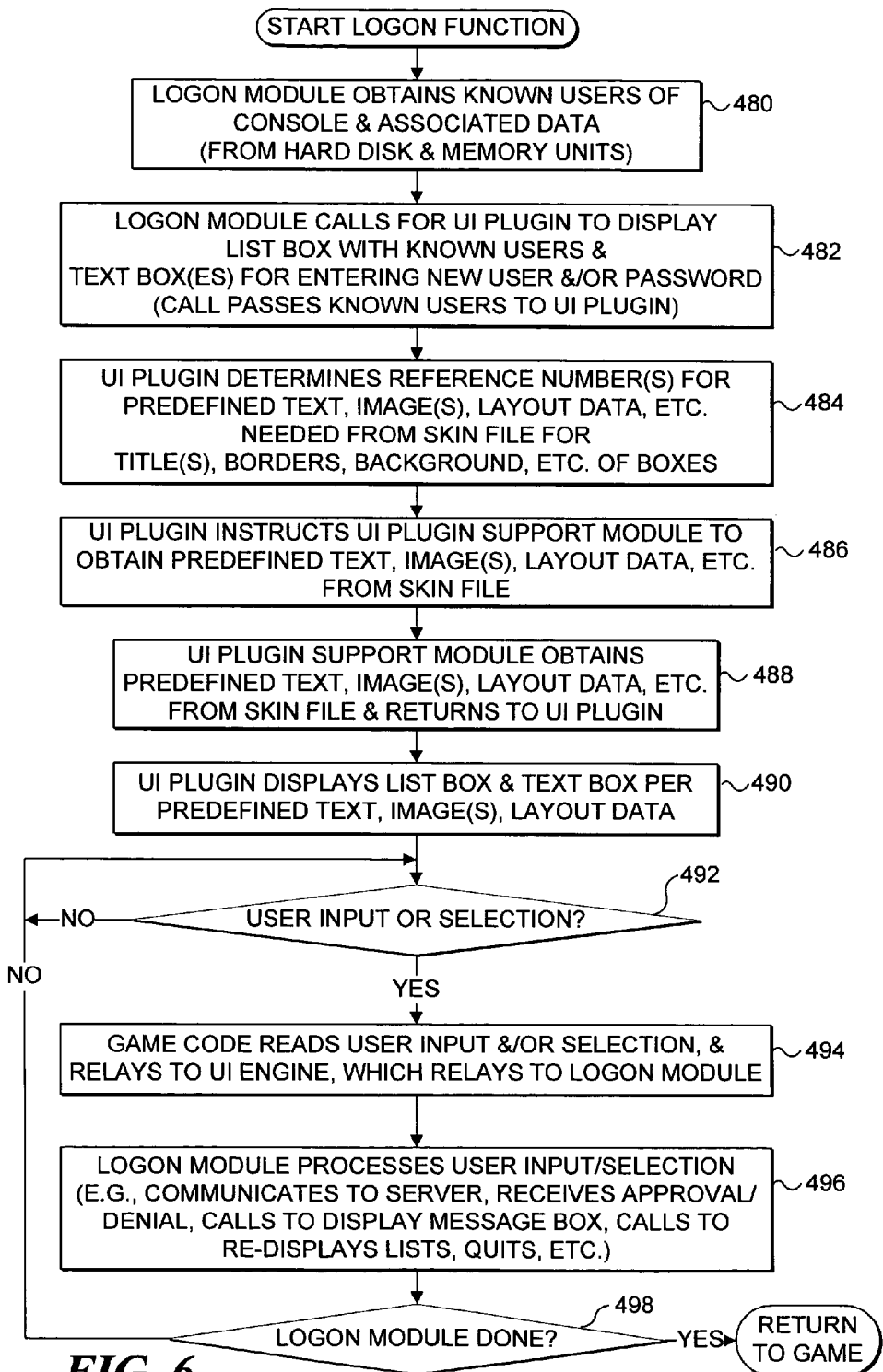
FIG. 6 is a flow diagram illustrating logic for an exemplary logon function.

FIG. 6 is a flow diagram illustrating the logic for an exemplary logon function to help the reader in understanding the broader description of FIG. 5. At a step 480 of FIG. 6, the logon module (e.g., logon UI module 414 of FIG. 4) obtains known users of the game console and obtains associated data, such as each user's last logon date. The list of known users and associated data can be obtained from the game console hard disk and/or from memory units currently installed in controllers connected to the game console. At a step 482, the logon module calls for the UI plug-in to display a list box with the known users. The logon module can also instruct the UI plug-in to display one or more data entry boxes for entering a new user identifier and/or a password. Preferably, the logon module requests the UI engine to make the call to the UI plug-in. However, as indicated above, the logon module can have direct communication with the UI plug-in, if the UI plug-in and the logon module are written to facilitate such direct communication. In any case, the known users are passed from the logon module to the UI plug-in.

At a step 484, the UI plug-in determines the layout data, image data, and predefined text data that are needed from the skin file. For example, to display the list box and data entry boxes, the UI plug-in determines the titles, borders, background image, and other display aspects that are needed for the list box and data entry boxes.

At a step 486, the UI plug-in then instructs the UI plug-in support module to obtain the predefined text, images, layout data, and other information needed from the skin file. The UI plug-in support module obtains the needed information, at a step 488, and returns the information to the UI plug-in. At a step 490, the UI plug-in displays the list box and data entry boxes at the predefined locations specified in the layout data and with the predefined text and images obtained from the skin file.

At a decision step 492, the game code determines whether the user has made a selection and/or has input any information (e.g., selected user ID and entered password). While the user has not yet entered any information or made a selection, the game code continues with other processing steps until a next frame. Once the user makes a selection and/or inputs data, the game code reads the user input and/or selection, at a step 494. The game code then relays the user input and/or selection to the UI engine, which relays the user input and/or selection to the logon module. At a step 496, the logon module processes the user input and/or selection. For example, the logon module can communicate the user ID and password to the online game service server, receive a response from the server, and act on the response. Acting on the response may involve further instructions to the UI plug-in to display a message box, redisplay the list of users, or perform another operation involving sensory interaction with the user. At a decision step 498, the logon module determines whether it has completed its function. If the logon module has not completed its function, control returns to decision step 492 to await further user input or control can return to another appropriate step to continue with logon processing. Once the logon module is done with its task, control returns to the game.

Figure 7:
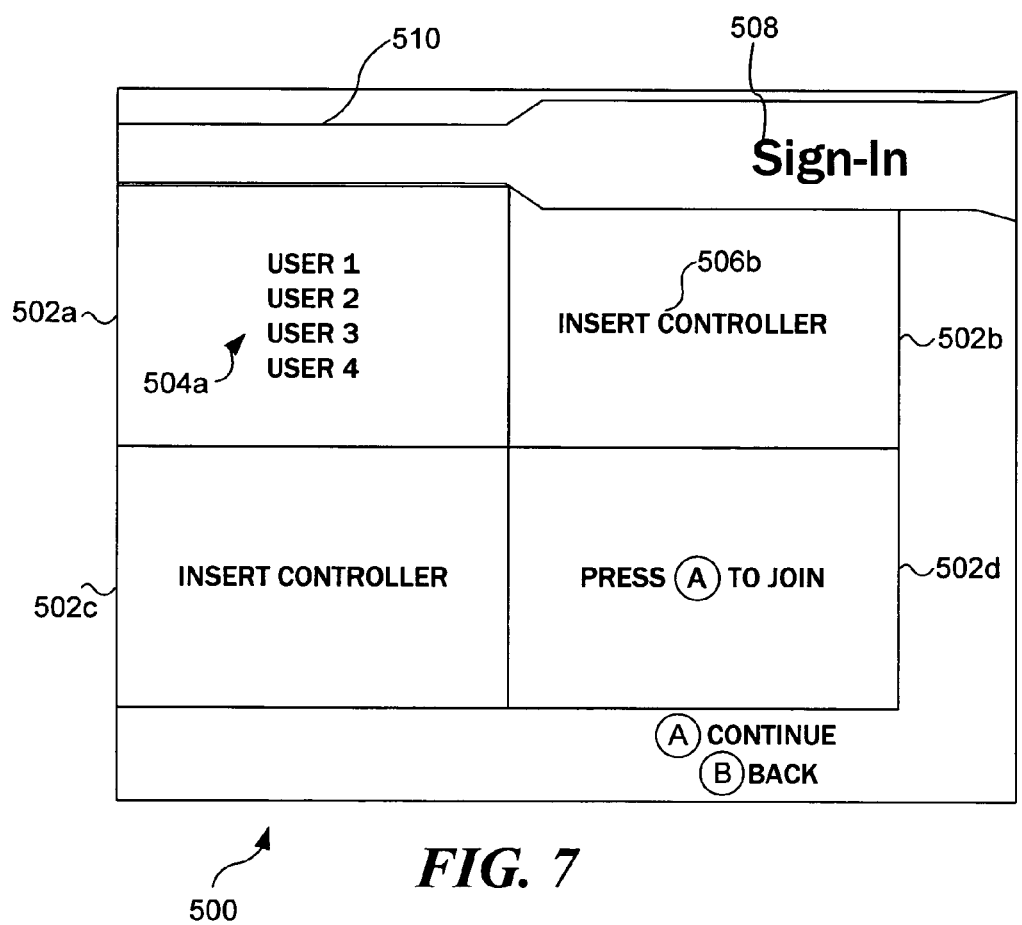
FIG. 7 illustrates a screen shot of an exemplary logon display for up to four players on a game console.

FIG. 7 illustrates a screen shot of an exemplary logon display 500 for four players of a game console. Logon display 500 enables the players to select a user ID to logon to a remote gaming service. Each player is associated with one of four status boxes 502a-502d. The logon status of each player and possible user IDs are provided by the logon UI module. The UI plug-in then displays the status or possible user IDs for the players to select. For example, status box 502a includes a user ID list 504a from which a first player can select to logon to the remote gaming service. Alternatively, a second status box 502b displays an inactive status 506b indicating that a controller is not connected to one of the four ports. The user ID data and status data from the logon module can be used to provide different display effects for the specific UI plug-in that is being used by the modular UI system. However, as discussed above, the display effects are independent of the logon module that obtained and provided the underlying user ID data and status data. Similarly, other display attributes are independently defined by the skin file. For example, the text, font, and size of a title 508 are predefined in the skin file and accessed by the UI plug-in. Changing the skin file would cause the UI plug-in to display title 508 according to the text, font, and size data specified in the new skin file. Other display aspects, such as a border graphic 510, are also independently predefined in the skin file.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. In a digital computing system that includes a main control program exemplified by any of a game code module, an application program, a simulation or an operating system, and wherein the main control program communicates with one or more functional user interface (UI) modules for data processing of a type which does not require human sensory interaction with a user of the computing system, as exemplified by displaying data entry fields, providing audio indications, video indications or other human perceptible sensory interface actions, a method of enabling change to any of the human sensory interactions such as visual data display, audio output or video display, without having to change the functional UI modules or main control program, comprising:

provproviding a common communication scheme for use between various types of UI modules, including functional UI modules for providing data for presentation to a user, and one or more UI plug-in software modules for implementing UI features by determining how to provide human sensory interaction through mechanisms such as visual display, video display, audio display or any combination of the foregoing;

networking a user interface (UI) engine having an engine interface with a main control program running on the computing system so as to provide communication of commands between the main control program and the UI engine;

networking to the UI engine and to the main control program and/or other network components one or more functional UI software modules for implementing UI features using functions that do not directly identify how to provide human sensory interaction with a user;

networking to the UI engine one or more UI plug-in software modules for implementing UI features that receive input from the one or more functional UI software modules and determine how to provide human sensory interaction through mechanisms such as visual display, video display, audio display, or any combination of the foregoing, such that the determination of how to provide human sensory interaction is determined by the one or more UI plug-in software modules and not by the main control program and/or the one or more functional UI software modules;

said one or more functional UI software modules communicating with the UI engine using said common UI communication scheme and thereby providing to one or more functional UI software modules or to the main control program human sensory interaction as required by either the one or more functional UI software modules or the main control program; and changing, adding or deleting one or more of the UI plug-in software modules so as to change the human sensory interaction of one or more functional UI software modules or the main control program, but otherwise leaving one or more functional UI software modules and main control program unchanged.

2. In a digital computing system that includes a main control program exemplified by any of a game code module, an application program, a simulation or an operating system, and wherein the main control program communicates with one or more functional user interface (UI) modules for data processing of a type which does not require human sensory interaction with a user of the computing system, as exemplified by displaying data entry fields, providing audio indications, video indications or other human perceptible sensory interface actions, a computer program product comprising a computer-readable medium having executable code for causing the computing system to execute a method of enabling change to any of the human sensory interactions such as visual data display, audio output or video display, without having to change the functional UI modules or main control program, and wherein the method comprises:

providing a common communication scheme for use between various types of UI modules, including functional UI modules for providing data for presentation to a user, and one or more UI plug-in software modules for implementing UI features by determining how to provide human sensory interaction through mechanisms such as visual display, video display, audio display or any combination of the foregoing;

networking a user interface (UI) engine having an engine interface with a main control program running on the computing system so as to provide communication of commands between the main control program and the UI engine;

networking to the UI engine and to the main control program and/or other network components one or more functional UI software modules for implementing UI features using functions that do not directly identify how to provide human sensory interaction with a user;

networking to the U"engine one or more U" plug-in software modules for implementing UI features that receive input from the one or more functional UI software modules and determine how to provide human sensory interaction through mechanisms such as visual display, video display, audio display, or any combination of the foregoing, such that the determination of how to provide human sensory interaction is determined by the one or more UI plug-in software modules and not by the main control program and/or the one or more functional UI software modules;

said one or more functional UI software modules communicating with the UI engine using said common UI communication scheme and thereby providing to one or more functional UI software modules or to the main control program human sensory interaction as required by either the one or more functional UI software modules or the main control program; and changing, adding or deleting one or more of the UI plug-in software modules so as to change the human sensory interaction of one or more functional UI software modules or the main control program, but otherwise leaving one or more functional UI software modules and main control program unchanged.

3. In a digital computing system that includes a main control program exemplified by any of a game code module, an application program, a simulation or an operating system, and wherein the main control program communicates with one or more functional user interface (UI) modules for data processing of a type which does not require human sensory interaction with a user of the computing system, as exemplified by displaying data entry fields, providing audio indications, video indications or other human perceptible sensory interface actions, a modular software interface system for enabling change to any of the human sensory interactions such as visual data display, audio output or video display, without having to change the functional user interface modules, comprising:
  a UI engine having an engine interface, and the UI engine being networked through the engine interface with a main control program running on the computing system so as to provide communication of commands between the main control program and the UI engine, and the UI engine providing a common communication scheme for use between other UI modules;
  one or more functional UI software modules for implementing UI features using functions that do not directly identify how to provide human sensory interaction with a user, said one or more functional UI software modules being networked so as to communicate with:
    i) the UI engine using said common UI communication scheme, and
    ii) the main control program and/or other network components; and
  one or more UI plug-in software modules for implementing UI features that determine how to provide human sensory interaction through mechanisms such as visual display, video display, audio display, or any combination of the foregoing, and said one or more functional UI software modules being networked so as to communicate with the UI engine using said common UI communication scheme, the one or more UI plug-in software modules providing human sensory interaction as required by either the main control program or other functional UI software modules in a manner such that the determination of how to provide sensory interaction is determined by the one or more UI plug-in software modules and not by the main control program and/or the one or more functional UI software modules, but the UI plug-in software modules being otherwise adapted to be changed with affecting or requiring changes to the main control program or other functional UI software modules.

4. The system of claim 3, the system further comprising:
  one or more setting files, each setting file providing a predefined set of sensory data to be used by the one or more UI plug-in software modules to determine how to provide sensory interaction.

5. The system of claim 4, wherein the main program, when executed, identifies which of the one or more functional UI software modules, the one or more UI plug-in software modules, and which of the one or more setting files to use when presenting data generated by, or at the request of, the main control program.

6. The method of claim 1 or 2, wherein the functional UI software modules enable at least one of:
  (a) a network communication feature for communicating data associated with a user interaction;
  (b) a data entry feature for enabling a user to enter data to at least one of a game, a simulation, or an application program;
  (c) a data display feature for enabling a user to view data that is obtained by and generated by one of the plurality of user interface modules; and
  (d) an audio feature.

7. The method of claim 1 or 2, further comprising a step for causing at least one of the functional UI software modules to specify a user interface object to at least one of the UI plug-in software modules, the specified user interface object providing a sensory interaction with the user.

8. The method of claim 1, further comprising a step for causing the at least one UI plug-in software module to select data from a predefined set of sensory data, the selected data corresponding to the user interface object specified by the at least one functional UI software module.

9. The method of claim 8, further comprising a step for modifying the predefined set of sensory data during a runtime operation.

10. The system of claim 3, wherein the functional UI software modules enable at least one of:
  (a) a network communication feature for communicating data associated with a user interaction;
  (b) a data entry feature for enabling a user to enter data to at least one of a game, a simulation, or an application program;
  (c) a data display feature for enabling a user to view data that is obtained by and generated by one of the plurality of user interface modules; and
  (d) an audio feature.

11. The system of claim 3, wherein at least one of the functional UI software modules specifies a user interface object to at least one of the UI plug-in modules, the specified user interface object providing a sensory interaction with the user.

12. The system of claim 11, wherein the predefined set of sensory data is modified during a runtime operation.

* * * * *